(No Model.) 3 Sheets—Sheet 1.

R. T. CRANE & J. C. KILGORE.
RADIATOR.

No. 580,572. Patented Apr. 13, 1897.

Witnesses
W. C. Coelies
C. H. Crawford

Inventors
Richard T. Crane
and
John C. Kilgore
by Atty Paul Synnestvedt (No Model.)
3 Sheets—Sheet 1.
R. T. CRANE & J. C. KILGORE.
RADIATOR.
No. 580,572.
Patented Apr. 13, 1897.
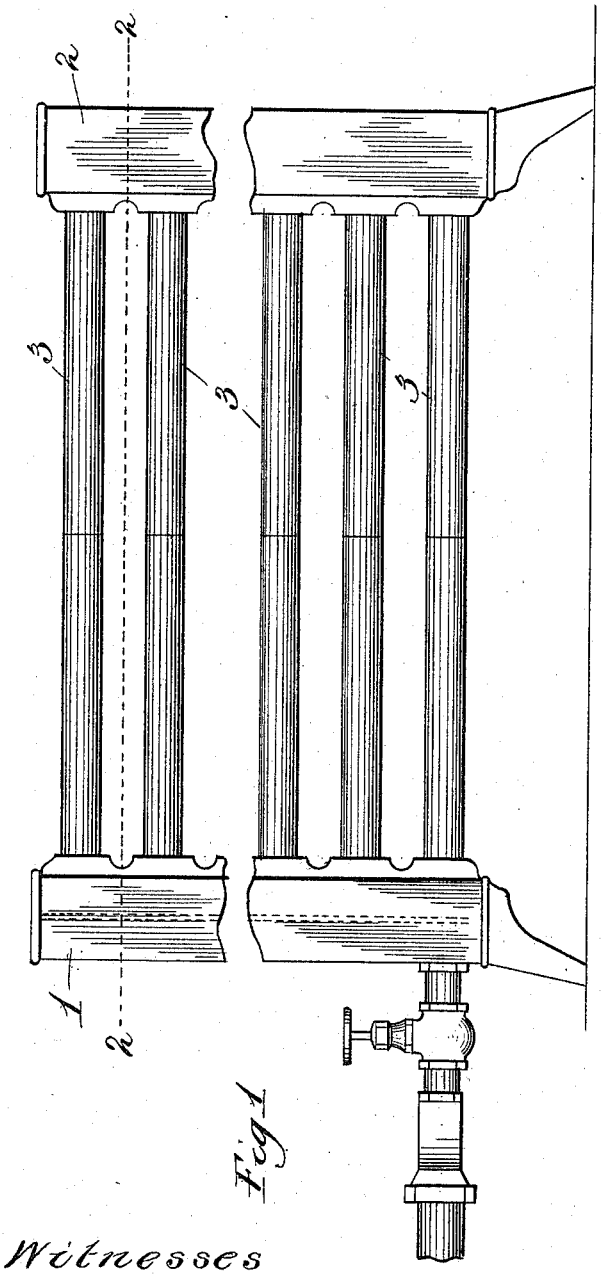
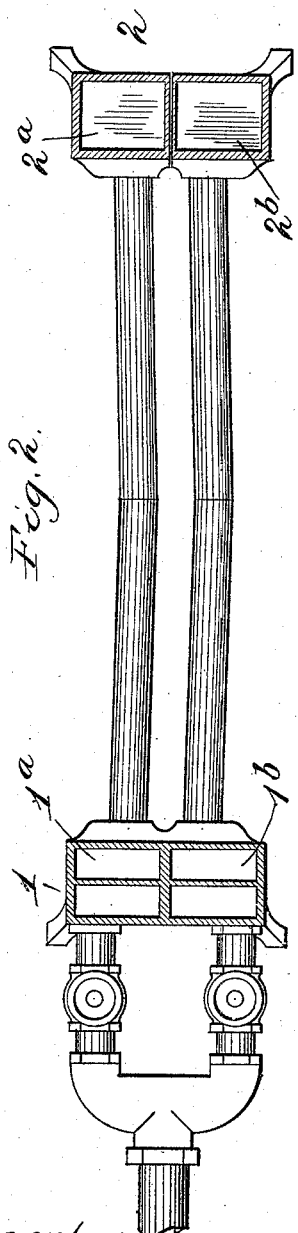

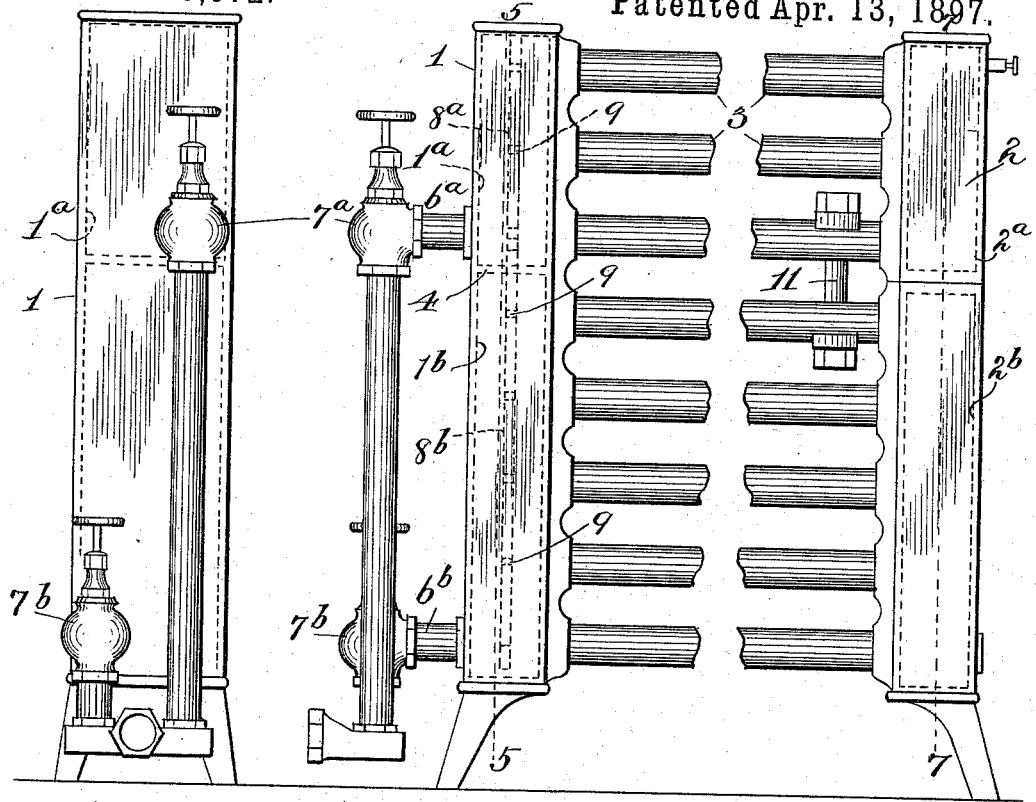

(No Model.) 3 Sheets—Sheet 3.
R. T. CRANE & J. C. KILGORE.
RADIATOR.
No. 580,572. Patented Apr. 13, 1897.
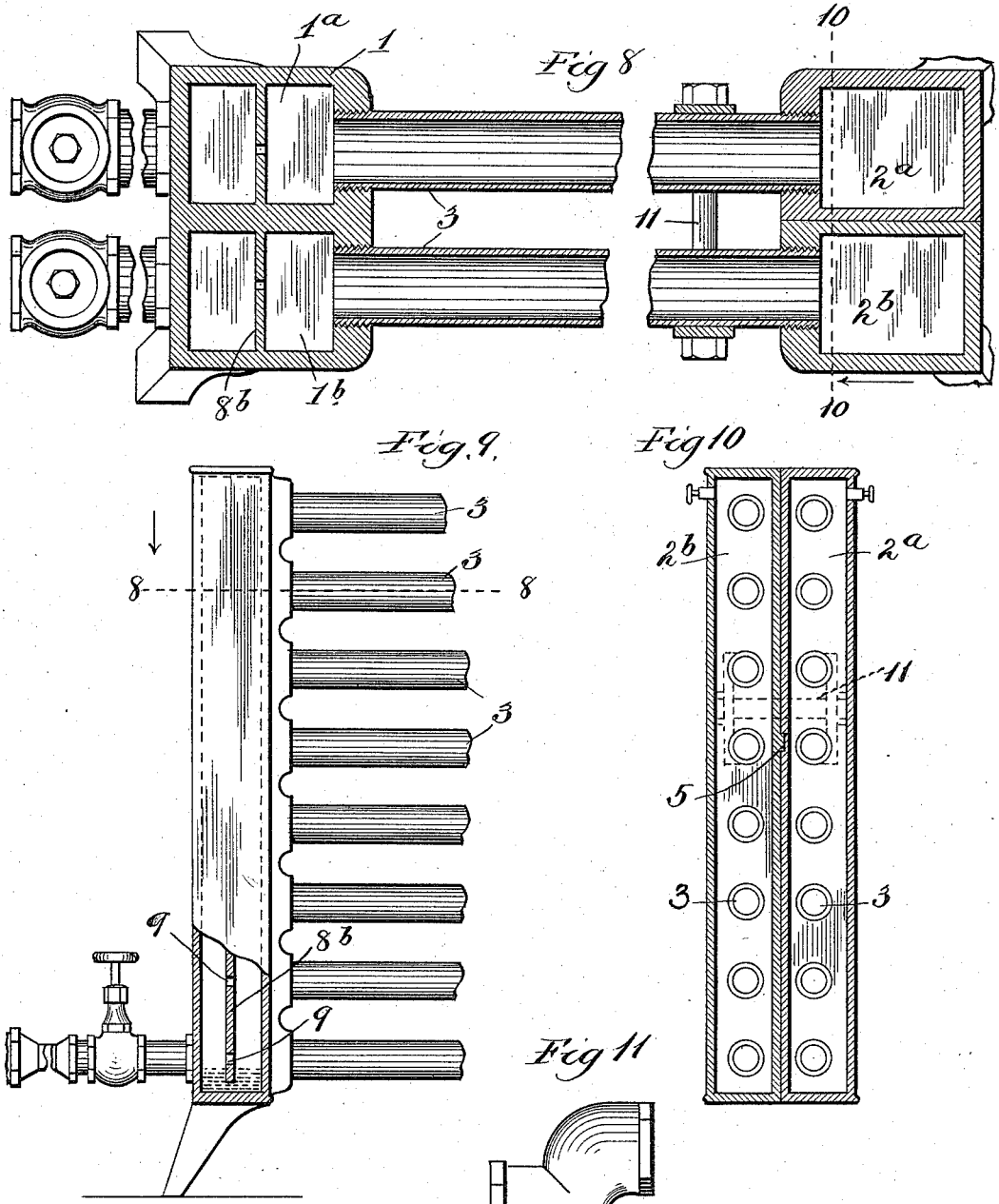
Witnesses
H. C. Coties
C. A. Crawford
Inventors
Richard T. Crane
and
John C. Kilgore
by atty Paul Synnestvedt

UNITED STATES PATENT OFFICE.

RICHARD T. CRANE AND JOHN C. KILGORE, OF CHICAGO, ILLINOIS; SAID KILGORE ASSIGNOR TO THE CRANE COMPANY, OF SAME PLACE.

RADIATOR.

SPECIFICATION forming part of Letters Patent No. 580,572, dated April 13, 1897.

Application filed July 15, 1896. Serial No. 599,330. (No model.)

*To all whom it may concern:*

Be it known that we, RICHARD T. CRANE and JOHN C. KILGORE, citizens of the United States, residing in Chicago, Cook county, Illinois, have invented certain new and useful Improvements in Radiators, of which the following is a specification.

The objects of our invention are, first, to provide a radiator of which the entire radiating-surface or a part—either one-third, one-half, two-thirds, or any predetermined amount—may be used at will; second, to prevent strains on the part of the radiator-coil, due to uneven expansion and contraction, and, third, to insure a more even distribution of the steam as it circulates through the various passages.

To the accomplishment of these ends our invention consists in certain details of construction to be specifically pointed out in the claims, and for the better understanding of which reference may now be had to the accompanying drawings, in which—

Figure 1:
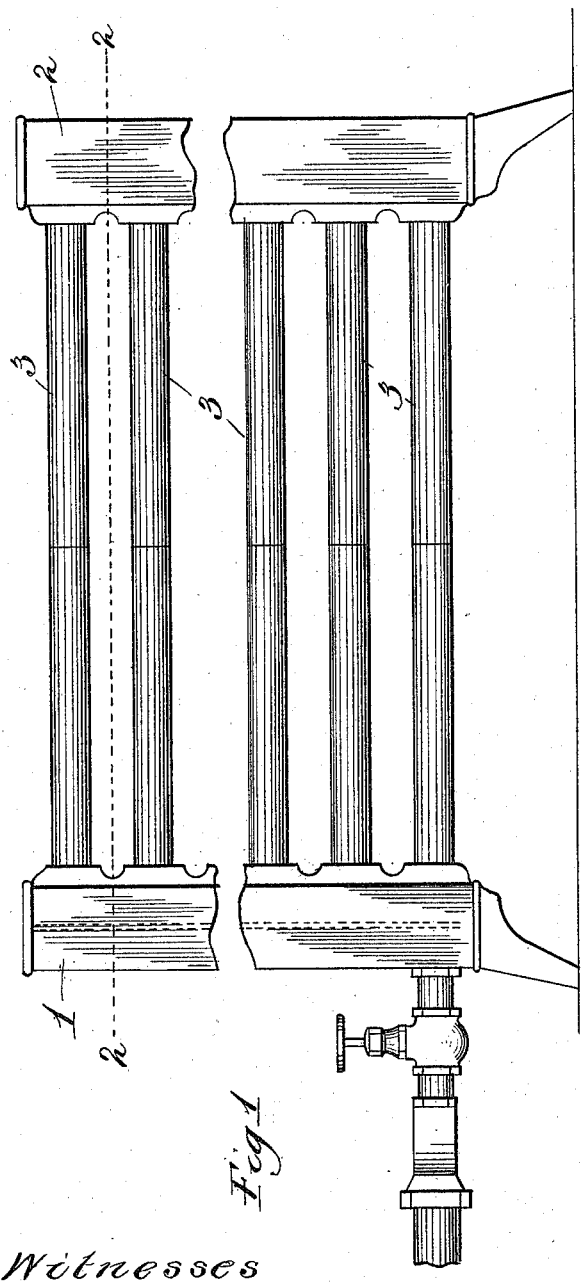
Figure 2:
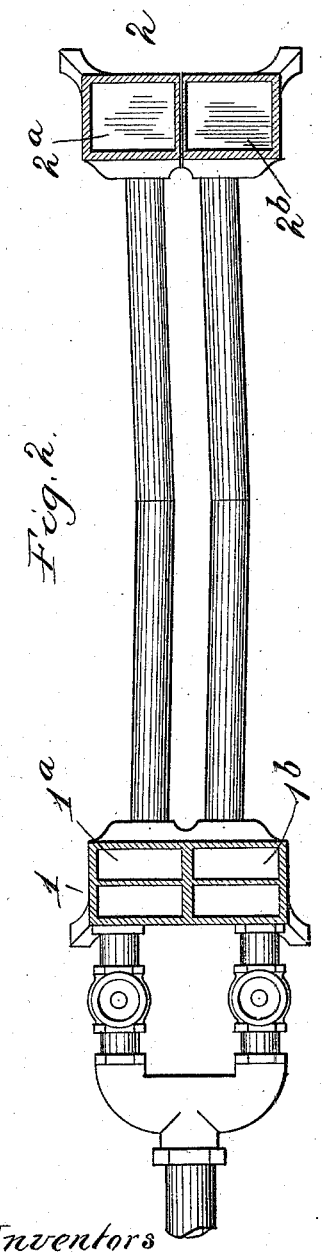

Figure 1 represents a side elevation of a radiator embodying our improvements. Fig. 2 is a plan section of the same on the line 2 2 of Fig. 1. Fig. 3 is an end view of a radiator embodying our improvements composed of two sections or compartments divided on a horizontal plane. Fig. 4 is a side view of the same. Fig. 5 is a section taken on the line 5 5 of Fig. 4. Fig. 6 is a partial vertical section of one of the end castings. Fig. 7 is a section taken on the line 7 7 of Fig. 4. Fig. 8 is a plan section taken through the center of two of the radiating-tubes. Fig. 9 is a side elevation on one of the end castings, showing at its lower end in broken section the construction of trap. Fig. 10 is a section taken on the line 10 10 of Fig. 8. Fig. 11 is a plan view of the casting which forms the connection between the supply-pipe and the two branches which lead to the head-end casting.

Referring now more particularly to Figs. 3, 4, 5, 6, and 7, which illustrate the form of construction which we prefer, it will be seen that in general we construct our radiator in three parts. These we shall designate as "head-end" casting, (marked 1,) "rear-end" casting 2, and "radiating-tubes" 3. The head-end casting is in the shape of a hollow box separated into two compartments $1^a$ and $1^b$ by a horizontal partition 4. The rear-end casting is composed of two separate hollow boxes, the upper one of which $2^a$ movably rests upon the lower one $2^b$ the plane of contact, however, being provided with a tongue and groove 5 (see Fig. 7) for the purpose of preventing lateral displacement of the two boxes relative to each other while permitting the endwise movement, which results from the uneven expansion of the tubes when one part, either the upper or the lower, is used independently of the other.

Steam-inlets $6^a$ and $6^b$, controlled by valves $7^a$ and $7^b$, are tapped into the compartments $1^a$ and $1^b$, respectively, at a point a short distance above the bottom of the same. This leaves at the bottom of each compartment a pocket adapted to hold a small quantity of water. Inside of each of the compartments $1^a$ and $1^b$ we secure a partition-plate, $8^a$ and $8^b$, perforated by small holes 9 opposite the ends of the radiating-tubes and having its lower end projecting down a slight distance below the bottom of the steam-supply pipe, so that when the water which collects in the pockets previously mentioned rises level with the bottom of the opening through which it drains it will cover the ends of the perforated partition-plates and form a kind of trap. This provision secures, as nearly as may be, a perfectly-even distribution of the steam to the different radiating-tubes, for as the water collected in the traps at the bottom of each of the compartments interferes with the free passage of the steam under the ends of the perforated plates it rises and passes through the perforations in the partition-plates before reaching the tubes, while at the same time there is no interference with proper draining of the condensed water out of the pipes as it freely passes under the lower ends of the perforated plates, the space being clearly shown in Fig. 5 at 10.

In Figs. 8, 9, 10, and 11 we have shown a modified form of our invention, in which the division between the two parts of the radiator is made vertically instead of horizontally, although, as we have stated, we prefer the construction first described. A horizontal division more readily separates into unequal parts, for example, as shown, one having three pairs of tubes and the other five pairs, whereas in the vertical division each side will more properly contain the same number. Thus with the horizontal division we secure three different degrees of radiating-surface, while with the vertical division we get but two.

In Figs. 8 and 9 we have used the same reference-characters as were used in the preceding figures to designate corresponding parts. In these figures the location and arrangement of the perforated plate and the water-trap at its lower end are more clearly shown than before. To prevent the two movable boxes comprising the end casting 2 from separating at their bearing-face, we have provided a bolt 11, the arrangement of which is clearly shown in the drawings. Other means of fastening could be substituted for the bolt, if desired.

Referring now back to Figs. 1 and 2, attention is called to the fact that the radiating-tubes are bent slightly at or near their middle point. This is done to still further compensate for unequal expansion and contraction which may result from steam feeding through to one tube a little faster than another, and thus to prevent all possibility of straining any of the joints and consequent leakage where the tubes are screwed into the end castings. Thus in Figs. 1 and 2 it will be seen that if steam should feed into the topmost tube a little slower than it did to the tube or radiating-pipe next below it, and as these two tubes are both screwed into the same castings at each end, there would be a strain produced on both of them which in time would cause leakage around the threads if there were no provision made which would permit either one or both of the tubes to give a little. We have found by experiment that a very slight bending of the tubes out of a straight line accomplishes the desired result, as they will then spring sidewise sufficiently to save the joint in case of unequal expansion, while if they are made perfectly straight they will not yield at all, and leaks soon appear around the threads.

Having thus described our invention, what we claim as new, and desire to secure by Letters Patent, is—

1. In a radiator the combination with a head-end casting, a rear-end casting, radiating-tubes connecting the same, and an inlet-opening in said head-end casting, of a perforated partition-plate within said head-end casting, said plate being set vertically with its lower end extending below the bottom of said inlet-opening whereby the steam is caused to ascend and pass through the perforations, substantially as described.

2. In a radiator the combination with a head-end casting, a rear-end casting, radiating-tubes connecting the same and an inlet-opening in said head-end casting; of a perforated partition-plate within the head-end casting, extending downward to a point below the bottom of said inlet-opening, but not to the bottom of the cavity within the head-end casting, the perforations in said plate being arranged at or near the openings into said radiating-tubes, substantially as shown and described.

3. In a radiator, the combination with two end castings, of tubes, for connecting the same together, which are, at or near their middle point, bent slightly out of a straight line, substantially as described.

4. In a radiator, the combination of a head-end casting containing two compartments of unequal dimensions separated by a horizontal partition; a rear-end casting comprising two separate hollow boxes of unequal dimensions corresponding with the compartments of the head-end casting, the upper one of which movably rests upon the lower one; and radiating-tubes connecting said end castings together; substantially as described.

5. In a radiator, the combination of a head-end casting containing two compartments; a rear-end casting comprising two separate hollow boxes; and a series of radiating-tubes connecting each of said compartments with one of said boxes, each of said boxes being movable independently of the other to compensate for expansion of the tubes substantially as shown and described.

6. In a radiator the combination of a head-end casting 1, containing compartments $1^a$ and $1^b$; a rear-end casting 2, comprising two separate hollow boxes $2^a$ and $2^b$ each movable independently of the other; and a series of radiating-tubes connecting each of said compartments with one of said boxes, substantially as shown and described.

RICHARD T. CRANE.
JOHN C. KILGORE.

Witnesses:
PAUL SYNNESTVEDT,
JOHN CONWAY.